United States Patent [19]

Courtaud et al.

[11] Patent Number: 5,352,366
[45] Date of Patent: Oct. 4, 1994

[54] METHOD FOR PURIFYING LIQUID FUEL BOILER SMOKE BY COOLING AND WASHING THE SMOKE AND NEUTRALIZING THE EFFLUENTS

[75] Inventors: Yves Courtaud, Brie Comte Robert; Claude Caveriviere, Vincennes, both of France

[73] Assignee: AQUAFRANCE, Roissy, France

[21] Appl. No.: 104,763

[22] Filed: Aug. 12, 1993

[30] Foreign Application Priority Data

Aug. 13, 1992 [FR] France .................. 92 09996

[51] Int. Cl.$^5$ ............................. B01D 47/06
[52] U.S. Cl. .................. 210/712; 210/737; 95/152; 95/197; 95/202; 95/205; 95/227; 95/237
[58] Field of Search ............ 95/152, 187–189, 95/193, 197, 202, 205, 227, 237; 210/712, 718, 721, 722, 724, 737, 743

[56] References Cited

U.S. PATENT DOCUMENTS

| | | | |
|---|---|---|---|
| 4,169,053 | 9/1979 | Sakakibara et al. | 210/724 |
| 4,170,458 | 10/1979 | Hartwick | 95/189 |
| 4,328,011 | 5/1982 | Geidies et al. | 95/202 |
| 4,600,561 | 7/1986 | Frei | 422/170 |
| 4,723,468 | 2/1988 | Schippert et al. | 95/205 |
| 4,959,084 | 9/1990 | Wolverton et al. | 95/187 |
| 4,964,885 | 10/1990 | Wieser-Linhart | 95/189 |

FOREIGN PATENT DOCUMENTS

| | | |
|---|---|---|
| 0148469 | 7/1985 | European Pat. Off. . |
| 0339683 | 11/1989 | European Pat. Off. . |
| 0373113 | 6/1990 | European Pat. Off. . |
| 0442074 | 8/1991 | European Pat. Off. . |
| 0487102 | 5/1992 | European Pat. Off. . |
| 2917720 | 11/1979 | Fed. Rep. of Germany . |

*Primary Examiner*—Thomas Wyse
*Attorney, Agent, or Firm*—Perry Carvellas

[57] ABSTRACT

To purify smoke from a liquid fuel (in particular heavy fuel oil) boiler by eliminating unwanted components including acids, the smoke, before it is exhausted to the atmosphere, is caused to pass along a vertical path in a heat exchanger adapted to recover the latent heat of condensible components together with the substantive heat of the smoke. Water is sprayed at the top of the vertical path and collected at the bottom in the form of an effluent comprising the water, condensates and soot. A reserve water supply is provided. Water is fed from this reserve supply to the top of the heat exchanger where it is sprayed after adding to it an alkaline solution in sufficient quantity to neutralize acid components of the smoke. The effluent is recovered at the bottom of the heat exchanger. An effective dose of a floculating agent is added to it. The effluent is fed into a settling tank where is separates into a soot sludge and a clarified effluent which is fed to the reserve water supply.

9 Claims, 1 Drawing Sheet

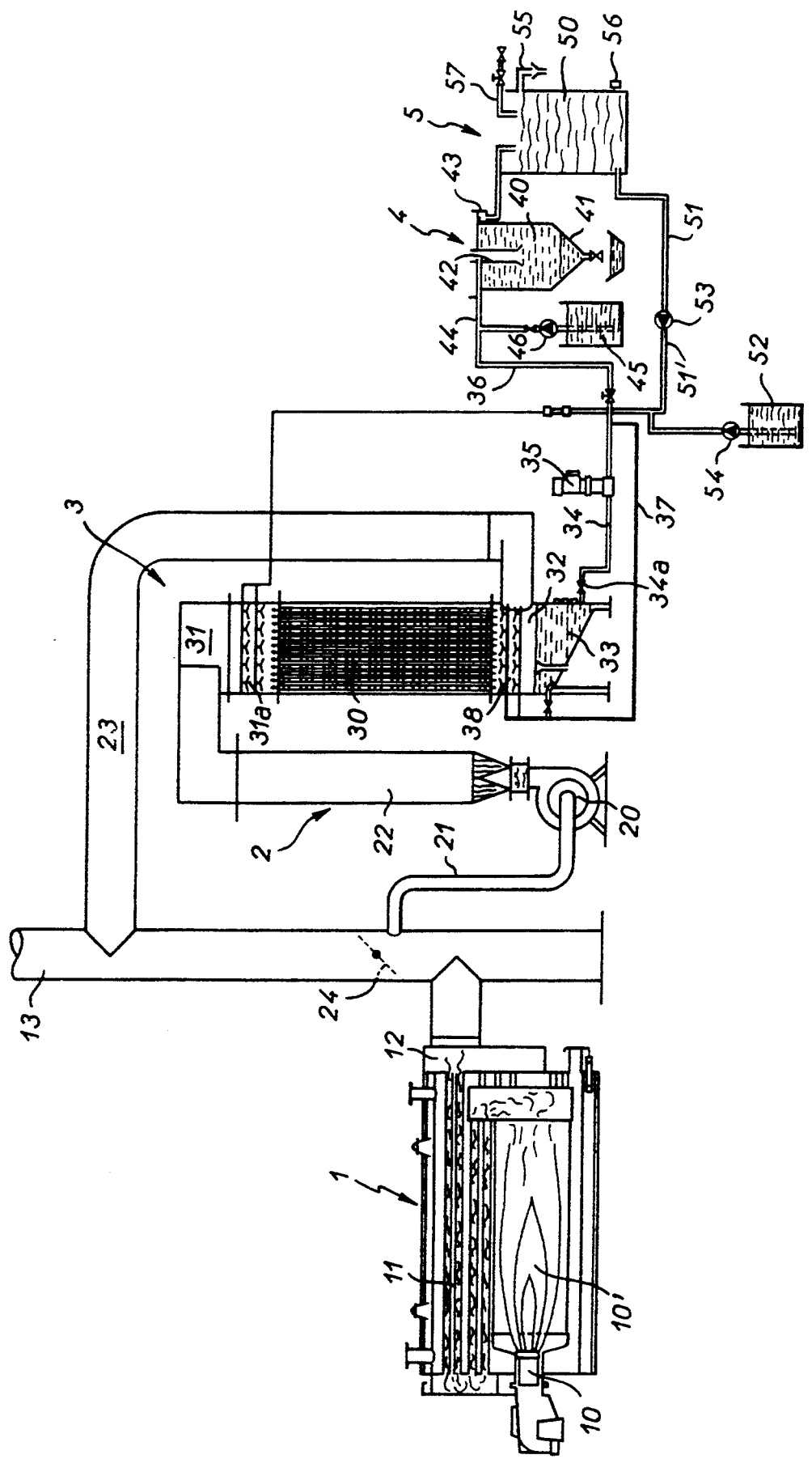

METHOD FOR PURIFYING LIQUID FUEL BOILER SMOKE BY COOLING AND WASHING THE SMOKE AND NEUTRALIZING THE EFFLUENTS

BACKGROUND OF THE INVENTION

1. Field of the Invention

The invention concerns a method of purifying smoke from a livid fuel (in particular heavy fuel oil) boiler by eliminating unwanted components including acids in which method the smoke, before it is exhausted to the atmosphere, is caused to pass along a vertical path in a heat exchanger adapted to recover the latent heat of condensible components together with the substantive heat of the smoke and water is sprayed at the top of said vertical path and collected at the bottom thereof in the form of an effluent comprising said water, condensates and soot.

2. Description of the Prior Art

There is no need to expatiate on the consequences of exhausting to the atmosphere smoke from liquid fuel boilers, such liquid fuel essentially comprising hydrocarbons. The smoke contains mainly water vapor, carbon monoxide, carbon dioxide and nitrogen from the combustion-supporting air. To give an idea of the orders of magnitude involved, combustion of 1 kg of hydrocarbon requires approximately 17.5 kg of and the smoke contains, assuming that all of the carbon is converted into carbon dioxide, approximately 14 kg of nitrogen, 3.14 kg of carbon dioxide, 1.28 kg of water vapor and less than 0.5 kg of oxygen.

The combustion of hydrocarbons produces various pollutants: at the temperature of the flame the reaction between the oxygen and nitrogen in the combustion-supporting air produces nitrogen oxides and the reaction between the sulfur and sulfur compounds in the hydrocarbons produces gaseous sulfur compounds, essentially sulfur dioxide and sulfur trioxide; the hydrocarbons contain trace amounts of many elements including heavy metals in particular; finally, the combustion of carbon-rich hydrocarbons produces soot.

Note that the quantities of nitrogen oxides and carbon monoxide depend on the condition of the flame. Although it is possible to reduce the amount of carbon monoxide in the smoke, for example by injecting secondary air, it is not possible in practise to reduce the amount of nitrogen oxides once formed. Turning to a separate issue, although exhausting water vapor into the atmosphere does not constitute pollution as such, the water vapor retains its latent heat of condensation. Also, on condensing in contact with the atmosphere, especially on leaving the chimney (to forth the wreath), it carries with it to ground level some of the pollutants which accompany it in the smoke; furthermore, the energy wasted as latent heat is reflected in excess fuel consumption.

It has been proposed to pass the smoke along a vertical path in a heat exchanger, to wash the smoke by spraying it with water at the top of the heat exchanger and to collect this water at the bottom of the heat exchanger in the forth of an effluent containing condensates and soot. Cooling the smoke recovers the latent heat of the condensates (which may be used to heat the boiler feed water). Additionally, the effluent contains dissolved carbon dioxide, sulfur dioxide and sulfur trioxide removed from the smoke.

This proves to be insufficient, however, given the limited solubility of carbon dioxide and sulfur dioxide in water at the necessarily high temperature of the effluent. Also, sulfur trioxide is only ever a minor proportion of the sulfur oxides and dissolving it in water further reduces the solubility of the carbon dioxide and sulfur dioxide.

Above all, the effluent collected at the bottom of the heat exchanger must be treated before it can be discharged into the environment. Eliminating the soot raises particular problems given that the behavior of suspensions is highly dependent on the composition of the suspension medium.

SUMMARY OF THE INVENTION

The invention consists in a method of purifying smoke from a liquid fuel (in particular heavy fuel oil) boiler by eliminating unwanted components including acids in which method the smoke, before it is exhausted to the atmosphere, is caused to pass along a vertical path in a heat exchanger adapted to recover the latent heat of condensible components together with the substantive heat of the smoke, water is sprayed at the top of said vertical path and collected at the bottom thereof in the forth of an effluent comprising said water, condensates and soot, a reserve water supply is provided, water is fed from said reserve supply to the top of said heat exchanger where it is sprayed after adding to it an alkaline solution in sufficient quantity to neutralize acid components of the smoke, the effluent is recovered at the bottom of said heat exchanger, an effective dose of a floculating agent is added to it, and said effluent is fed into a settling tank where is separates into a soot sludge and a clarified effluent which is fed to said reserve water supply.

By adding an alkaline solution to the water sprayed at the top of the heat exchanger virtually all of the $SO_3$ in the smoke and up to 95% of the $SO_2$ are fixed while a minor but not negligible proportion of the $CO_2$ is eliminated. The addition of a floculating agent to the effluent collected at the bottom of the heat exchanger enables separation of the soot in a settling tank followed by re-use of the cleaned effluent by spraying it at the top of the heat exchanger. The water consumption is much reduced, all the more so in that the contribution of the condensates replenishes the water in the reserve water supply where the quantity of dissolved materials remains moderate. The materials dispersed into the environment are virtually harmless. Finally, virtually all of the heavy metals are found in the soot sludge, the volume and consistency of which facilitate handling and elimination.

Other features and advantages of the invention will emerge from the following description given by way of example with reference to the single appended drawing which shows a liquid fuel boiler associated with plant for implementing the method in accordance with the invention.

DETAILED DESCRIPTION OF THE INVENTION

Referring to the drawing, the boiler 1 comprises a burner 10 which forms a horizontal flame 10'. The hot gases flow through an array of tubes passing through a water chamber and terminate at a smoke box 12 connected to a chimney 13. The boiler may be entirely conventional.

A bypass circuit 2 shunts the lower part of the chimney 13. An offtake 21 a small distance above the outlet from the smoke box 12 into the chimney 13 leads to the inlet of a draw-off fan 20. The fan 20 feeds a vertical pipe 22 which ends at the top of a heat exchanger 3 to be described later. A pipe 23 runs from the bottom of the heat exchanger 3 to a point On the chimney 13 above the offtake 21. A butterfly valve 24 is disposed in the chimney 13 between the offtake 21 and the outlet from the pipe 23. When the fan 20 is running and the butterfly valve 24 has shut off the chimney 13 the smoke is fed to the top of the heat exchanger 3, passes vertically downwards through it and returns to the chimney 13 via the pipe 23. The butterfly valve 24 prevents smoke discharged from the pipe 23 into the chimney 13 being sucked out against the flow by the fan 20. When the fan 20 is stopped and the butterfly valve 24 is open, on the other hand, the smoke travels upwards in the chimney 13 to be dispersed into the atmosphere and the plant specific to the invention has no effect.

The heat exchanger 3 comprises a vertical tower housing a heat exchanger unit 30 comprising a cylindrical chamber fed with water through which passes a vertical bundle of smoke tubes. This chamber heats the boiler feed water. Above the heat exchanger unit is a top smoke box 31 into which the pipe 22 from the fan 20 discharges. In the top smoke box 31 there is provided a plurality of spray nozzles 31a directed downwards and fed by a pipe 30b.

Below the heat exchanger unit 30 is a bottom smoke box 32 from which the pipe 23 leads to the chimney 13.

Below the bottom smoke box 32 the heat exchanger 3 forms a recovery tank 33 with an outlet 34a at is lowest point connected by a pipe 34 to the inlet of a circulating pump 25 the outlet of which is connected by a pipe 36 to a settling tank 4 to be described later.. A recycling pipe 37 branches off from the pipe 36 and leads to the recovery tank 33 through a throttle valve and to spray manifolds 38 in the bottom smoke box 32 at the level of the outlet to the pipe 23.

The settling tank 4 comprises a cylindrical body 40 with a conical bottom 41 with a valve through which the sediment sludge is extracted. The upper part of the body 40 forms an overflow and is surrounded by a circular trough 43 from the lowest part of which a clarified liquid pipe leads to a storage tank 5 described later.

At the center of the body is a vertical tube 42 which extends above the upper edge of the body and is immersed to half the depth of the body; a feed pipe 44 for the liquid to be decanted leads into this tube 42.

The pipe 44 extends the pipe 36 connected to the outlet of the circulating pump 35 beyond the point at which it merges with the outlet of a metering pump 46 which draws floculating agent from a storage tank 45.

The reserve water supply 5 comprises a tank 50 provided with an overflow 55. It receives liquid from the settling tank 4 via the pipe 43. The tank has an outlet pipe 51 incorporating a positive displacement pump 53. A pH meter 56 at the bottom of the tank monitors the pH in the tank 50 and regulates it if necessary. Beyond the positive displacement pump 53 a pipe 51' joins the pipe 31b which feeds the spray nozzles 31a in the top smoke box 31 of the heat exchanger 3. Shortly downstream of the positive displacement pump 53, however, the pipe 51 receives an alkaline solution (20.4 g/l approx. soda solution) taken from a storage tank 52 by a metering pump 54.

A water inlet 57 controlled by a valve tops the content of the tank 50 up to the level of the overflow when necessary.

The operation of the system under steady state conditions will now be described.

With the burner 10 operating, the fan 20 running and the butterfly valve 24 turned to block off the chimney 13, smoke from the smoke box 12 passes through the heat exchanger unit 30 from the top smoke box 31 to the bottom smoke box 32. Cooling of the smoke in the heat exchanger unit 30 causes most of the water vapor formed in the flame to condense. As already mentioned, the water fed into the cooling circuit of the heat exchanger unit 30 is heated and can be used either to feed the boiler 1 or as an auxiliary hot water supply. The positive displacement pump 53 draws off water from the tank 50 to feed it to the top spray manifolds 31a of the heat exchanger 3. The soda solution from the storage tank 52 is added to this water by the metering pump 54 in quantities such that the acid components of the smoke are neutralized (see below for a further explanation of what is meant by neutralization of the acid components).

The washing water sprayed in at the top and the condensates from the smoke form an effluent in the tank 33. The circulating pump 35 draws off effluent from the tank 33 and feeds it to the settling tank 34. The recycling pipe 37 diverts some of the effluent from the pump 35 to the tank 33, either directly or via the bottom manifolds 38. The recirculation flowrate is controlled such that the level of effluent in the tank 33 reaches and exceeds the lower level of the outlet to the pipe 23. This produces strong turbulence at the level of the smoke outlet which increases the liquid/gas separation surface area at the bottom of the heat exchanger for improved capture of acid components.

The effluent in the tank 33 contains a suspension of soot washed down by the water sprayed at the top of the heat exchanger. An organic floculating agent (A1881) from the tank 45 is injected by the metering pump 46 to enable the soot to settle out on the bottom of the settling tank 41. The clarified effluent overflows into the trough 43 whence it is returned to the reserve water supply tank 50. Note that the charged effluent is fed through the center of the cylindrical body 40 and therefore does not mix with the clarified liquid. Note also that because of the presence of the condensates from the smoke, the volume of effluent returning to the reserve water supply tank 50 is significantly greater than the volume of water sprayed via the top manifolds 31a. Accordingly, under steady state conditions the surplus clarified effluent in the tank 50 flows over the overflow 55 to form a secondary effluent.

The total alkalinity of the effluent (as defined by its pH) must be compatible with that allowed by regulations for safe discharge into the environment, as must the level of material in suspension (MIS) and the chemical oxygen demand (COD) in the effluent. These parameters are interdependent.

The floculating agent affects the sedimentation of soot only in a range of pH values around the theoretical neutral point pH=7 which does not exceed the value of 8.5 for basic pH. With a higher value of pH the soot would be present in the secondary effluent were it not for the fact that the method would not be usable because it would result in spraying water laden with soot at the top of the heat exchanger.

The acid components are $CO_2$, $SH_2$, $SO_2$ and $SO_3$. With a properly adjusted flame with 10 to 20% excess air, $SH_2$ is produced in negligible quantities. Most of the sulfur turns into sulfur dioxide and a minor proportion into sulfur trioxide.

In practise neutralizing this sulfur trioxide with soda is no problem. Recycling via the pipe 37 retains up to 95% of the $SO_2$ at a pH of around 7.5–8. Measuring the pH in the tank and adjusting the quantity of soda solution injected via the top manifolds 31a of the heat exchanger 3 provide a compromise between the contradictory requirements to neutralize the effluent and to eliminate or recover the soot sludge. On removal from the settling tank this sludge has a dry content of 20% and could feasibly be burnt as secondary fuel.

Eliminating the $CO_2$ from the smoke would seem to be much more difficult, firstly because combustion of heavy fuel oil produces much more $CO_2$ than sulfur compounds (a heavy fuel oil containing 0.55% by weight of sulfur produces around 1% by weight of sulfur compounds when burned and more than 300% of $CO_2$); secondly, complete neutralization of carbon dioxide anions occurs only at high pH.

Floculation of the soot requires the pH of the effluent to be kept low, however, as already mentioned. It is therefore important to meter correctly the solution of soda added to the water sprayed at the top of the heat exchanger 3. This can be done by slaving the output of the pump 54 to the pH as measured by the pH meter 56 in the reserve water supply tank 50 and by ensuring efficient mixing of the sprayed water with the condensates in the tank 33 at the bottom of the heat exchanger.

In addition to this, consideration might be given to adding hydrogen peroxide to the water sprayed at the top of the heat exchanger to achieve substantially complete oxidation of sulfites into sulfates to reduce the COD. Oxidation is usually done on the final effluent exiting the overflow 55.

At this point the oxidizing agent may be sodium hypochlorite. Moreover, once oxidation has converted virtually all the sulfur compounds into sulfates, the latter may be precipitated in the form of calcium sulfate by adding an appropriate quantity of lime. After the calcium sulfate has settled out the effluent contains amounts of sulfates compatible with protection of the environment and applicable regulations. The calcium sulfate can be exploited commercially as a soil improving agent.

With regard to the $CO_2$ in the smoke, pilot tests have shown that 10 to 15% of this $CO_2$ can be extracted by adding alkaline solution to the spray water without hindering floculation of the soot. Recovery of latent and substantive heat in the smoke represents 10 to 15% energy recovery and this means that, for the same usable heat energy, the quantity of $CO_2$ exhausted into the atmosphere is reduced by 20 to 28%. Although sulfur and nitrogen oxides are atmospheric pollutants regardless of the quantities in which they may be exhausted into the atmosphere, $CO_2$ is a pollutant only if its local concentration significantly exceeds its normal concentration in the atmosphere so that it is likely to affect the atmosphere-biosphere-ocean ecosystem.

When the installation is started up, the circulating pump 35 and the positive displacement pump 53 are started before the burner is lit. The fan 20 is started as soon as the burner is lit. The butterfly valve 24 is shut and then the metering pumps 46 and 54 are turned on at a rate equivalent to average conditions of operation of the installation, as determined beforehand. The flow-rates of the metering pumps are then adjusted manually or by an automatic control system to suit the actual conditions under which the installation is operating.

Trials have been carried out on a pilot installation connected to a swimming pool heating boiler with the following specifications:

| | |
|---|---|
| Burner flame thermal power | 100 kW |
| Fuel: TBTS heavy fuel oil with sulfur | 0.55% by weight |
| Fuel LCV | 10 180 kcal/kg |
| Fuel consumption | 9 kg/h |
| Volume of smoke | 115 m³/h (20° C., 1 atm.) |
| The following results were obtained: | |
| Combustion efficiency increase | 10–11% |
| $SO_2$ elimination | 98% |
| $CO_2$ elimination | 15% |
| Soot capture | 90–95% |

It was also found that the amount of carbon monoxide discharged into the atmosphere was reduced by 33% and the nitrogen oxides by 4%. The dry content of the sludge was approximately 20%; after drying, the loss on ignition was 90%; this latter result indicates that it is feasible to recycle the sludge into the hearth for increased thermal efficiency at installed powers in the order of 1 MW.

The invention is naturally not limited to the example described but encompasses all variant executions thereof within the scope of the claims.

There is claimed:

1. Method of purifying smoke from a liquid fuel boiler by eliminating unwanted components including acids in which method the smoke, before it is exhausted to the atmosphere, is caused to pass along a vertical path in a heat exchanger adapted to recover the latent heat of condensible components together with the substantive heat of the smoke, water is sprayed at the top of said vertical path and collected at the bottom thereof in the form of an effluent comprising said water, condensates and soot, a reserve water supply is provided, water is fed from said reserve supply to the top of said heat exchanger where it is sprayed after adding to it an alkaline solution in sufficient quantity to neutralize acid components of the smoke, the effluent is recovered at the bottom of said heat exchanger, an effective dose of a floculating agent is added to it, and said effluent is fed into a settling tank where is separates into a soot sludge and a clarified effluent which is fed to said reserve water supply.

2. Method according to claim 1 wherein said smoke is caused to flow downwards in said heat exchanger.

3. Method according to claim 2 wherein said heat exchanger is disposed on a bypass of a smoke path between said boiler and a chimney discharging into the atmosphere, flow in said heat exchanger being forced flow.

4. Method according to claim 1 wherein some of said effluent recovered at the bottom of said heat exchanger is reinjected at the bottom of said heat exchanger.

5. Method according to claim 1 wherein the pH of the water in said reserve water supply is measured and the quantity of said alkaline solution added to said water fed to the top of said heat exchanger is controlled to maintain the measured pH between chosen limits.

6. Method according to claim 1 wherein an oxidizing agent is added to said reserve water supply in the event that it contains unwanted sulfites in order to convert said sulfites into sulfates.

7. Method according to claim 6 wherein overflow from said reserve water supply caused by the addition of condensates is recovered as a final effluent and said oxidizing agent is added to said final effluent.

8. Method according to claim 6 wherein after substantially all sulfites in said final effluent have been oxidized to sulfates said sulfates are precipitated in the form of calcium sulfate by adding lime.

9. Method according to claim 1 wherein overflow from said reserve water supply caused by the addition of condensates is recovered as a final effluent.

* * * * *